United States Patent [19]

Crosby et al.

[11] Patent Number: 5,075,356
[45] Date of Patent: Dec. 24, 1991

[54] BISPHENOL AND NEOPENTYL GLYCOL DIGLYCIDYL ETHERS WITH GLYCIDYL METHACRYLATE COPOLYMER

[75] Inventors: David A. Crosby, Sandy; Kenneth A. Lowe, West Valley City, both of Utah

[73] Assignee: Hercules Incorporated, Wilmington, Del.

[21] Appl. No.: 613,421

[22] Filed: Nov. 15, 1990

[51] Int. Cl.$^5$ .................. C08L 33/14; C08L 63/02
[52] U.S. Cl. .................................. 523/429; 523/428; 525/113
[58] Field of Search ............... 523/428, 429; 525/113, 525/117

[56] References Cited

U.S. PATENT DOCUMENTS 4,038,454  7/1977  Lehmann et al. .................... 525/117
4,616,066  10/1986  Tominaga ............................ 525/117

FOREIGN PATENT DOCUMENTS 53-1227   1/1978  Japan .................... 525/117
59-98169  6/1984  Japan .................... 525/117
59-129269 7/1984  Japan .................... 525/117

Primary Examiner—John C. Bleutge
Assistant Examiner—Robert E. L. Sellers, II
Attorney, Agent, or Firm—Mark Goldberg

[57] ABSTRACT

A resin composition especially suited to the resin transfer molding and wet filament winding processes is composed of epoxide compounds and one or more aromatic amine hardeners wherein the blend of epoxide compounds is (i) a diglycidyl ether of the reaction product of a bisphenol and a blend of (a) a diglycidyl ether of bisphenol A other than that of (i) and (b) a halohydrin having about two epoxy groups per molecule, (ii) a copolymer of ethyl hexyl acrylate and glycidyl methacrylate and (iii) a neopentyl glycol digylcidyl ether. This composition has a low viscosity, and when cured, exhibits high toughness and mechanical strengths useful in making high performance composites.

9 Claims, No Drawings

BISPHENOL AND NEOPENTYL GLYCOL DIGLYCIDYL ETHERS WITH GLYCIDYL METHACRYLATE COPOLYMER

FIELD OF INVENTION

This invention relates to an unusual blend of resinous epoxy compounds useful as filament winding resins and also in the resin transfer molding process and to the structures resulting from curing these epoxy winding resins in combination with high strength fibers. This invention, more particularly, relates to a novel formulation, incorporating these epoxy compounds, such formulation having low viscosity but curing into matrices for tough, high performance composites.

BACKGROUND OF THE INVENTION

The resin transfer molding (RTM) process is a manufacturing process for producing high quality composite structures in a cost-effective manner. Composite parts having complex geometries may be fabricated by this process in which liquid reactants are injected at low pressures in the range of about 275 to 414 kPa into a mold containing a fiber-reinforcement preform. The multiple plies of the fiber preform may be stacked inside the mold, factory-stitched or tacked together in some other fashion to provide precise fiber placement. The thermosetting, liquid polymer reactants of the resin system may be heated (to reduce viscosity) and injected through a static mixer into the mold, while vacuum evacuation of the preform is applied to reduce void formation and increase the resin transfer speed. When resin infusion is complete, the mold assembly is ramped to a cure temperature, dependent on the resin system, to effect a complete thermal cure of the composite part. Optionally, the composite part may be rapidly cured to an intermediate stage and removed from the mold, after which a free-standing post-cure is applied. This approach allows for more efficient mold use.

A major problem associated with prior art RTM resins is the difficulty of obtaining thermosetting matrices of high toughness that possess low viscosity at ambient temperatures. Tough resins such as liquid polybutadiene polymers and aliphatic, flexible chain epoxies lack the stiffness and operating temperature properties required for aerospace quality composite structures. Resin matrices such as polyester resin lack both toughness and capability for service at elevated temperatures, while other thermosetting matrix materials such as standard epoxies, polyimides, cyanate esters and bismaleimides either lack toughness or exhibit a high viscosity that necessitates processing at elevated temperatures. High process temperatures are undesirable because working life is reduced due to resin advancement; precise control of resin temperatures becomes more critical, reducing robustness of the process with more expensive, high temperature resistant mold and plumbing apparatus being required. The use of resin transfer molding in fabricating quality aerospace composite laminates that need high toughness has previously been accomplished only by using high viscosity thermoset or thermoplastic polymers and processing them at elevated temperatures.

The resin compositions of this invention also have application as filament winding resins. Wet filament winding is an art long practiced in manufacture of rocket motor cases and other high performance composite structures. Important in this art is selection of an appropriate winding resin for use in providing the matrix of the resultant composite structures containing high strength, continuous filaments in a form such as rovings, tows or bundles of glass, carbon, aramid, boron or like fiber. The fiber reinforcement preforms used in the RTM process are made from any of the aforementioned fibers.

The selection of an appropriate winding resin needs to consider a number of factors including the type of body being wound, e.g. size of the body, complexity in the shape of the body as well as the desired mechanical properties of the final cured composite. Generally, although desired mechanical properties alone would seem to drive selection in high performance applications, these final properties can be governed to a large degree by how well the winding resin is adapted to the filament winding application.

Development of desirable winding resins for wide applicability in making high performance composites requires an artful selection among a number of competing factors, particularly with respect to provision of winding resins that have sufficiently wide windows of processability for general application to a number of winding situations. For example, the winding resin needs sufficiently low viscosity for extended periods to enable consistent and thorough impregnation of the rovings, tows or bundles prior to completion of the winding operation. But the viscosity should be not so low as to permit resin migration after the rovings, tows or bundles are wound on the mandrel or other body shaping the filaments into desired form for the composite structure. The winding resin also needs to have adequate working life so that the body being wound has sufficient tack to accept and retain precise placement of subsequently applied rovings, tows or bundles in completing the filament wound body. Still other factors of adequate winding resins include appropriate gel time at ambient temperature, i.e. the time after winding after which the resin provides some integrity in holding high strength filaments in precise relation to their application, as well as controlled viscosity changes during heating used for curing the wound preform. A satisfactory winding resin therefore has many of the same properties as those desired in a resin for the RTM process.

Winding resins, even having an acceptable compromise of the foregoing and other factors, need also to provide a final cured body with adequate high and low temperature mechanical properties, particularly tensile strength, as well as, in the case of pressure vessels serving as rocket motor cases, desired strength at high pressure and high toughness to improve reliability in the field.

Resinous epoxy compounds formulated with curing agents such as primary amines have been found useful in meeting many of the foregoing criteria so as to serve, when properly formulated, as desirable winding resin systems. However, a long standing problem with these formulations has been the difficulty in achieving high toughness in low viscosity (<2000 cps) resin systems. The challenge has been to develop appropriately low viscosity and desired wetting characteristics of the formulated resin prior to winding so as to allow adequate impregnation of the rovings, tows or bundles, coupled with acceptable gel time, working life and other criteria, in combination with providing adequate mechanical properties and high impact resistance to the resulting composite wound body after curing.

High viscosity resinous epoxy compounds having high molecular weight per epoxy group are known for their ability to provide toughness and elevated temperature resistance to winding resins that cure into high strength filament wound bodies. Lower viscosity winding resins comprising multi-functional resinous epoxy compounds having a lower molecular weight per epoxy group are known in providing advantageously better wetting characteristics at lower processing temperature than high viscosity resins; however, these low viscosity resinous epoxy compounds yield filament wound composite structures with lower strength, particularly at elevated temperatures. The foregoing dichotomy has been mitigated to some degree by heating high viscosity winding resins prior to their impregnation of the rovings, tows or bundles of high strength filaments used in filament winding, and then winding these filaments on the body shaping the uncured composite. However, such heating adds unwanted complexity to filament winding operations and undesirably advances the winding resin.

Low viscosity winding resins have been described, for example, in U.S. Pat. No. 4,255,302 to Adams, et al. This patent discloses a composition of the diglycidyl ether of bisphenol A, a diglycidyl ester of linoleic dimer acid, a diglycidyl ether of butanediol, and an aromatic amine curing agent. The fiber used with the disclosed composition is Kevlar ® polyarylamide fiber.

U.S. Pat. No. 4,778,851 to Henton et al. discloses epoxy resin compositions that have been toughened by including as a dispersed phase rubber particles having a grafted shell which is cocurable with the epoxy resin. Crosslinked acrylic rubber cores are preferred. Polyepoxides are preferably glycidyl ethers of polyhydric alcohols including bisphenol A.

Another composition of epoxy resins useful as a matrix resin in combination with fiber is disclosed in U.S. Pat. No. 4,515,912 to Sayles. U.S. Pat. No. '912 describes a low shrink resin which includes a blend of bisspiroortho carbonate, an amine curing agent which is o-phenylenediamine boron trifluroide etherate, butanediol diglycidyl ether, the diglycidyl ether of bisphenol A and the epoxidized dimer of oleic acid.

U.S. Pat. No. 4,101,693 to Tsen, et al. discloses low viscosity, epoxy precursor resins made from a combination of an epoxy resin of a diglycidyl ether which is the reaction product of bisphenol A and epichlorohydrin having an equivalent weight of 170 to 200 and an average functionality of not more than two epoxy groups per molecule with a diglycidyl ether of bisphenol A of equivalent weight of 600 to 1600 having not more than two epoxy groups per molecule.

U.S. Pat. No. 4,309,473 to Minamisawa, et al. discloses high viscosity, prepreg epoxy resins, where the fiber strand is a high strength fiber and the resin comprises a thermo-setting resin such as an epoxy resin of bisphenol A and epichlorohydrin having a softening point of 60° C. or less in combination with an epoxy resin having an average molecular weight of about 10,000 or more.

SUMMARY OF THE INVENTION

Now, in accordance with this invention, a resin has been discovered which has characteristics especially suitable for resin transfer molding impregnation of rovings, tows or bundles of high strength filaments at low temperature to yield filament wound preforms which cure into high strength, impact resistant composites.

The resin comprises three resinous epoxy compounds including (a) an aromatic resinous epoxy compound having about two epoxy groups per molecule that is the diglycidyl ether reaction product made by reacting a bisphenol and a halohydrin; (b) a blend of (i) the reaction products of epichlorohydrin and bisphenol A and (ii) a copolymer of ethyl hexyl acrylate and glycidyl methacrylate and (c) a neopentyl glycol digylcidyl ether.

This combination of epoxy resins and a blend of aromatic amine hardeners has been found to provide low viscosity resins which cure into high strength composites. The resin comprises a combination of (i) from about 47 to about 56 weight percent of a first resinous epoxy compound which is diglycidyl ether reaction product made by reacting a bisphenol and a halohydrin and having at least two epoxy groups per molecule, the reaction product having the formula I below:

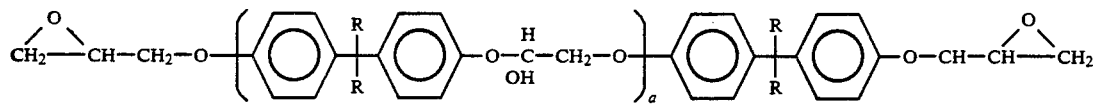

wherein a is 0.5 to 3 and R is methyl or lower alkyl; a blend of (i) the reaction products of epichlorohydrin and bisphenol A and (ii) a copolymer of ethyl hexyl acrylate and glycidyl methacrylate and (c) a neopentyl glycol digylcidyl ether of formula II set forth below:

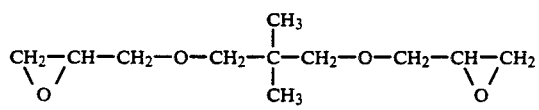

The resins of this invention further contains aromatic amine hardeners of formulas III, IV, or V set forth below:

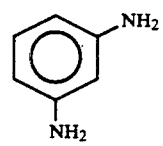

III

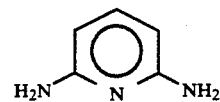

IV

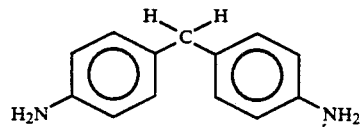

V

A preferred mix ratio is about 4 to about 6 parts of Formula III to about 1 to 3 parts by weight of formula IV. The amine hardeners are incorporated stoichiometrically into the resin system at a preferred amine to epoxy ratio of 1.11:1.

When the resins of this invention are used as winding resins, such resins are simultaneously applied to the fiber during winding and while it is being formed into the desired structure. This generates a structure of a desired shape, generally consisting of about 60 to 80 weight percent fiber and about 20 to about 40 weight percent resin. In accordance with this invention the winding resin is applied to the fiber at room temperature, yet, structures of high strength and high toughness are obtained.

The preferred method of employing winding resins of this invention comprises first mixing the resinous epoxy compounds together in conjunction with forming a separate, liquid mixture of aromatic hardeners. These mixtures are blended shortly before impregnating the filaments that are wound together in forming the filament wound body. Alternatively, these mixtures may be stored at ambient temperature for extended periods of time and blended in the correct proportion when needed to support a filament winding operation.

DETAILED DESCRIPTION OF PREFERRED EMBODIMENTS

The preferred resins of this invention are made in a first embodiment by first blending the three resinous epoxy compounds, one of which includes the elastomer modified diglycidyl ether of bisphenol A. (The term resinous epoxy compound as used herein refers to a resin containing the simplest epoxide group which is a three membered ring,

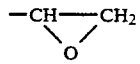

The term epoxy (or epoxide), 1,2-epoxy (or epoxide), vicinal epoxy (or epoxide) and oxirane group are also art recognized terms used to describe this epoxide group.) A second component is prepared in a separate vessel by combining the two component aromatic hardener composition.

The blend of the resinous epoxy compounds in this first embodiment is a mixture of a diglycidyl ether of the reaction product of bisphenol A and epichlorohydrin of formula I (above) having about two epoxy groups per molecule, from about 12 to about 50 weight percent of a blend of (a) the reaction products of epichlorohydrin and bisphenol A and (b) a copolymer of ethyl hexyl acrylate and glycidyl methacrylate, in a ratio that ranges from 50:5 to 95:50 and in which an especially preferred amount is about 10 to 16 weight percent of a 60:40 blend of the components (a) and (b); and from about 16 to about 28 weight percent of a neopentyl glycol diglycidyl ether resin of formula II (above).

The bisphenol A derivative (formula I) imparts a degree of toughness and strength to the cured resin achieved by the other components of the resin. This resinous epoxy compound also has a high viscosity so the amount of it chosen in the reaction mixture is such that the total viscosity of the precursor resin composition at room temperature immediately after mixing is not greater than 850 cps. Resinous epoxy compounds of this type which are particularly useful are described by formula I and are available commercially as Epi-Rez ® resins sold by Hi-Tek Polymers, Inc. or as DER 332 resin from Dow Chemical Company. Preferred viscosities of the diglycidyl ether resins of formula I useful for this invention are from about 4,000 to about 20,000 cps with molecular weights in the range of about 350 to 500. Other epoxidized halohydrin and polyhydric phenols are also useful in this invention. Such epoxy resins are sold under the trade names of EPON ® by Shell Chemical Corp., Araldite ® by Ciba Geigy, ERL ® by Union Carbide and DER ® by Dow Chemical Co.

Incorporation of the acrylic rubber modified diglycidyl ether of bisphenol A is critical to achieving the impact resistance of the resin system. It is important that this component be of small particle size in order to allow for the impregnation of fiber preforms in the RTM process without filtration or inducement of fiber washout.

Amine hardeners preferred for use in this invention are described by formulas III and IV (above). Examples of these aromatic amine hardeners are 2,6-diaminopyridine, 2,4-toluenediamine, dianisidine, meta-phenylene diamine, para-phenylene diamine, diamino-phenyl sulfone, diaminodiphenyl sulfide, 4,4'-methylenedianiline, and diethyltoluenediamine. The most preferred hardeners are mixtures of 2,6-diaminopyridine and meta-phenylene diamine. These materials are selected to (a) control open time and pregel time (b) control the amine to total epoxy ratio in the range from about 1.2 to 0.8 and (c) provide high toughness without seriously degrading physical and mechanical properties. The total amine hardener in the epoxy composition is from about 11 to 16 percent by weight.

The above mixture of rate-controlling resinous epoxy compound and amine hardener are preferably heated in order to aid the dissolution of the hardener. The mixture is preferably kept below 70° C. because gelation or premature reaction can occur. After the two blends are prepared, they are mixed together to form the final composition. The resulting winding resin composition is used to coat the high strength fiber in filament winding applications at room temperature or can be stored at 0° C. or less until time of use.

The components of this embodiment are chosen such that the resulting resin composition for use with high strength fibers in wet filament winding applications has an open time of eight hours or greater at room temperature and a pregel time of from about 48 to about 72 hours at room temperature. In addition they are chosen so that the cured resin of the combination of the chosen ingredients when cured at 163° C. or greater has a toughness as indicated by GIC of 8.5 in-lb/in$^2$, a tensile modulus of greater than 440 ksi, and has a glass transition temperature of greater than 124° C.

When the resins of this invention are used in the filament winding applications, they are applied to the high strength fibers simultaneously in the filament winding operation. The resin is simultaneously applied to the fiber by a variety of application methods well known in the art such as by a metering process or pickup roller and wound onto a surface of revolution. This generates structures comprising from about 60 to 80 weight percent fiber and about 20 to about 40 weight percent resin. A particularly useful amount of resin to use when the fiber is carbon fiber is from about 30 to 40 weight percent. Normally, the resin composition of this invention is applied at room temperature at a viscosity of from about 700 to about 5,000 cps. A particularly preferred range is from about 800 to about 1500 cps. In the process described above, tension is generated as a running load between the mandrel surface and filament band which forces out air and excess resin and allows each successive layer to ultimately rest on solid material while the remaining interstices are filled with resin. Precision of fiber placement plus tension and viscosity control are primary controlling factors in the attainment of high fiber content which is generally desired for high strength.

In second embodiment of this invention, the winding resins are used as two component, storage stable resins. The first component is a blend of the aforedescribed resinous epoxy compounds of formulas I, II and III. The second component is a blend of curing agents heated slightly (e.g. about 54°-60° C.) so as to provide a liquid or molten mixture of the curing agents which are blended with the first component shortly before winding. Each of the separate blends may be stored for extended periods of time (at least 6 months) at room temperature until needed, at which time the two blends may be combined in the correct proportion to yield the resin composition which is the subject of this invention. When the two blends are combined the resin eventually becomes glassy and gels at ambient temperature in 60-72 hours. This room temperature gel behavior is important for filament winding applications which require immobilization of the resin prior to cure. Final conversion to a thermoset, crosslinked network with structural integrity is accomplished by simple oven cure at elevated temperatures up to 300° F., facilitating a short manufacturing cycle. Non-isothermal rapid cures have been applied to the compositions of this invention without causing outgassing during cure. These two component winding resins have the advantage of necessitating the blending of minimal amounts of the resin thereby reducing waste. In this second embodiment of the invention, automated resin mixing and dispensing equipment can be used to cost-effectively supply blended resin upon demand.

In an alternative method of employing the epoxy resin compositions of this invention, the fiber is preimpregnated with the blended resin. In this process a fiber tow is brought into contact with the epoxy resin composition and the resin is coated onto the tow at a specified thickness that leaves a closely controlled amount of resin on the fiber. Such preimpregnated fiber tows are then fused on contact (allowed to react) at a later time to form the desired shaped structure. This contact process can take place on a mandrel if desired. In this process the resin content of the impregnated fiber is about 30 to 40 weight percent.

In methods described herein, resin tack is an important consideration. The level of tack of the resin composition employed generally dictates the modification necessary to the fiber guide or tow systems of the winding machines when the resin is applied. The epoxy resin compositions of this invention have the desired degree of tack before progressing into their pregel state.

Once the body comprising the winding resin and high strength fiber prepreg is formed, the winding resin is allowed to cure at room temperature to the pregel stage. This normally occurs after about 48 to 72 hours at room temperature. Shorter times are preferably and the wound body can be heated to about 50° C. to 70° C. to hasten this process if desired. The preferred pregel time is from about 48 to about 72 hours at room temperature, or four hours at 70° C. Once the resin has reached the pregel stage, i.e. becomes a hard tack free resin, it is ready for the final cure. This is achieved by heating the partially cured wound body to a temperature ranging from 121° C. to 175° C. or greater until about greater than about 95% of the theoretical amount of the curing reaction has occurred. This heating cycle normally generates a resin having a tensile strength of greater than about 11,000 psi when tested at 25° C. and a glass transition temperature of greater than about 124° C. A particularly useful curing temperature is about 150° C. for about two hours. This time will, of course, depend on the size and thickness of the structure being cured because of thermal diffusion considerations. As the temperature is decreased, longer times to reach the desired degree of cure of 95% or greater will be required. Ninety-five percent of the reaction can be monitored by the final physical properties or by amount of residual monomeric epoxy resin remaining after reaction.

The following example illustrates this invention but is not meant to limit the scope of the invention. All parts are parts by weight and all temperatures are in degrees celsius unless otherwise stated in this example.

In the Example below, resin tensile strength, modulus and elongation were performed by the procedure used in ASTM method D-638. Glass transition temperature ($T_g$) is measured by differential scanning calorimetry (DSC), thermo-mechanical analysis (TMA), or modulus loss analysis. Burst strength is measured by a procedure similar to ASTM method D-2585.

EXAMPLE 1

Into a first vessel were added 1638.4 parts of a diglycidyl ether of the reaction product of bisphenol A and epichlorohydrin having about two epoxy groups per molecule (DER 332 ® resin from Hi-Tek Polymers), which was preheated to 40°-50° C., 390.4 parts of an acrylic elastomer-modified diglycidyl ether of bisphenol A (XU71790.04L from Dow Chemical Company)), which was also preheated to 40°-50° C., and 704 parts of a neopentyl glycol diglycidyl ether (Heloxy 68 from Wilmington Chemical Company), which was stirred in at 25° C. These resins were stirred for 5 minutes at room temperature. Into a second vessel was added 339.2 parts of meta-phenylenediamine. The vessel was placed in a heating mantle at 75° C. for about 4 hours until the meta-phenylenediamine was liquified and then 128.0 parts of 2,6 diaminopyridine was poured in while stirring. This mixture, which constituted the second component of the resin system was stirred for about 10 minutes at 70°-75° C. The second component was maintained at 65°-75° C. was then added while stirring to the first mixture maintained at room temperature (25° C.). The resulting composition was stirred for 5 minutes and then cooled in a water bath until it reached 25°-30° C. The viscosity was determined to be 800 cps.

The resin composition was cast into plates which upon curing had a toughness as indicated by $G_{IC}$ of 8.5 in-lb/in$^2$, a glass transition temperature of 131° C. and tensile strength of 11,003 psi, modulus of 461 ksi and elongation of 8.27%, when tested according to ASTM D-638 at 25° C. The resin was injected at 25°-35° C. by the resin transfer process into a mold that was charged with a 24 ply, AG193P woven fiber preform in a quasi-isotropic layup. The cured panel exhibited low void content and excellent surface cosmetics, and was found to have a compression strength of 37.0 ksi after impact of 1500 in-lb/in when tested according to Boeing Material Specification BMS 8-276. A 6-inch diameter pressure bottle was wet filament wound on a wash-out eutectic salt mandrel with a chlorobutyl rubber liner with this resin composition and Hercules IM7G type carbon fiber at about 6 lb tension, using hoops and 26.9 Helicals in the winding sequence of helical, hoop, helical, hoop, helical (XOXOX). The filament wound structure was cured in an oven at 149° C. for 2 hours. The burst strength (hoop fiber stress) when measured at 25° C. was found to be 761 ksi.

EXAMPLE 2

The effect of compounding variations on physical mechanical, thermal and kinetic properties of the resin defined above was determined by varying the concentration levels of the aforedescribed resinous components, wherein the first component which is typified by DER 332 ® from Dow Chemical Company. was varied from 5 to 43 weight percent; the second component typified by XU71790.04 from Dow Chemical Company. was varied from 0 to 37.5 weight percent; the third component typified by Heloxy 68 was varied in concentration level from 0 to 25.5 weight percent. The aromatic amine curative blend was replaced with various mixtures of diethyltoluene diamine, para-aminocyclohexyl methane, and proprietary amine mixtures such as HY-350 and LSU 952 from Ciba-Geigy Chemical, AmiCure 101 and PACM from Air Products and Chemicals, Inc.; MDPA and Ethacure 100 from Ethyl Corporation; H41 from Dow Chemical Company; and Silvamine 50 from Sylvachem Corporation. It was found that viscosities ranged from about 700 cps to 3300 cps at 25° C.; glass transition temperatures ranged from less than 115° C. to over 154° C.; and impact resistance, when testing 2-inch diameter 10 gram neat resin disks in the Gardner Falling Dart Apparatus, varied from 5 to over 80 in-lb.; and gel times at 177° C. varied from about 1 minute to over 25 minutes. The best balance of low viscosity, high toughness, high glass transition temperature, and long working life was achieved optimally in the composition of Example 1. None of the curatives or blends thereof were found to produce high toughness without degrading physical or mechanical properties.

The effect of cure temperature on neat resin tensile and other properties was determined by curing the resin at four different temperatures (121° C., 149° C., 163° C. and 177° C.). A total of twenty specimens were fabricated and tested according to ASTM D-638. Tensile strength ranged from 10982 to 11192 psi; modulus ranged from 450.2 to 461.4 ksi and elongation at failure ranged from 6.85 to 8.27%. The toughness varied by about 25%, and the glass transition temperature ranged from 124° C. to 131° C. These results demonstrated that the resin is tolerant of cure cycles ranging from 121° C. to 177° C. without degrading tensile properties and therefore is compatible with industry standard prepreg resin systems.

What is claimed is:

1. A resin composition consisting essentially of a mixture of (i) from about 30-45 weight percent of a diglycidyl ether of the reaction product of a bisphenol and a halohydrin having about two epoxy groups per molecule, (ii) from about 12 to about 50 weight percent of a blend of (a) a diglycidyl ether of bisphenol A other than that of (i) and (b) a copolymer of ethyl hexyl acrylate and glycidyl methacrylate, in a ratio that ranges from 50:5 to 95:50 (a) and (b); and (iii) from about 16 to about 28 weight percent of a neopentyl glycol diglycidyl ether and (iv) a quantity of one or more aromatic amine hardeners, wherein sufficient amine hardener is present for said resin composition to have an amine to epoxy ratio of about 1.11 to 1.

2. The resin composition of claim 1 wherein said blend is about 10 to 16 weight percent of a 60:40 blend of a and b.

3. A precursor resin composition prepared by a process comprising dissolving at a temperature about 25° C. ingredients consisting essentially of:
   (a) A mixture of (i) about 47 to 56 percent by weight of a diglycidylether of the reaction product of bisphenol A and epichlorohydrin having about two epoxy groups per molecule of formula I below:

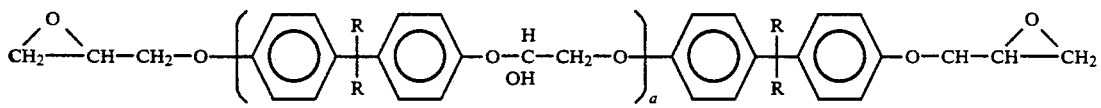

wherein a equals 0.5 to 3, and (ii) from about 12 to about 50 weight percent of a blend of (a) a diglycidyl ether of bisphenol A other than that of (i) and (b) a copolymer of ethyl hexyl acrylate and glycidyl methacrylate, in a ratio that is between 50:5 to 95:50 and (iii) from about 16 to 28 weight percent of a neopentyl glycol diglycidyl ether having formula II below:

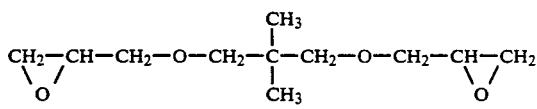

and (iv) a sufficient amount of one or more aromatic amine hardeners of formulas III, IV and V below to produce a resin precursor having an amine to epoxy ratio of about 1.11:1:

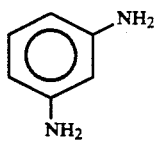
III

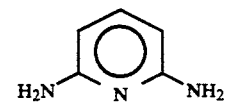
IV

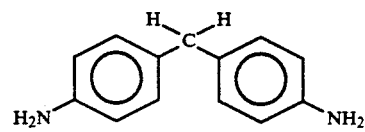
V

4. The precursor resin of claim 3 wherein said amount of aromatic amine hardeners is about 4 to 6 parts of formula III to about 1 to 3 parts by weight of formula IV.

5. The resin composition of claim 2 which has an open time of about at least eight hours at room temperature, a pregel time of from about 48 to about 72 hours at room temperature, and which when cured has a glass transition temperature of greater than 124° C. and a strain energy release rate (GIC) of about 8.5 in-lb/in².

6. The resin composition of claim 1 wherein said aromatic amine hardener comprises a mixture of meta-phenylene diamine and 2,6-diaminopyridine.

7. The composition of claim 1 wherein the composition includes a high strength fiber wherein said fiber represents 60 to 85 weight percent of the composition.

8. The composition of claim 8 wherein said fiber is carbon fiber.

9. A structure which comprises 60 to 85 volume percent of a fiber and from 15 to 40 weight percent of the resin composition of claim 1.

* * * * *

UNITED STATES PATENT AND TRADEMARK OFFICE
CERTIFICATE OF CORRECTION

PATENT NO. : 5,075,356

DATED : December 24, 1991

INVENTOR(S) : David A. Crosby and Kenneth A. Lowe

It is certified that error appears in the above-identified patent and that said Letters Patent is hereby corrected as shown below:

In the Abstract on the cover page, lines 6 to 9 which currently read "of a bisphenol and a blend of (a) a diglycidyl ether of bisphenol A other than that of (i) and (b) a halohydrin having about two epoxy groups per molecule, (ii) a copolymer" should read --of a bisphenol and a halohydrin having about two epoxy groups per molecule, (ii) a blend of (a) a diglycidyl ether of bisphenol A other than that of (i) and (b), a copolymer--.

Signed and Sealed this

Thirteenth Day of April, 1993

Attest:

STEPHEN G. KUNIN

*Attesting Officer*  *Acting Commissioner of Patents and Trademarks*